United States Patent Office
3,321,037
Patented May 23, 1967

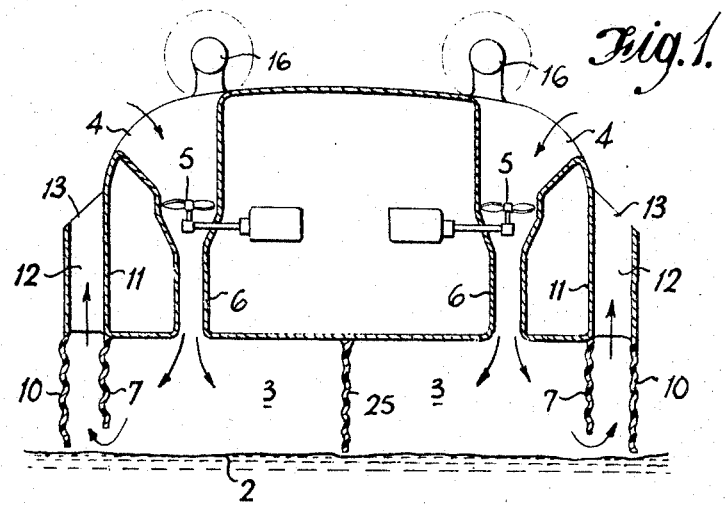

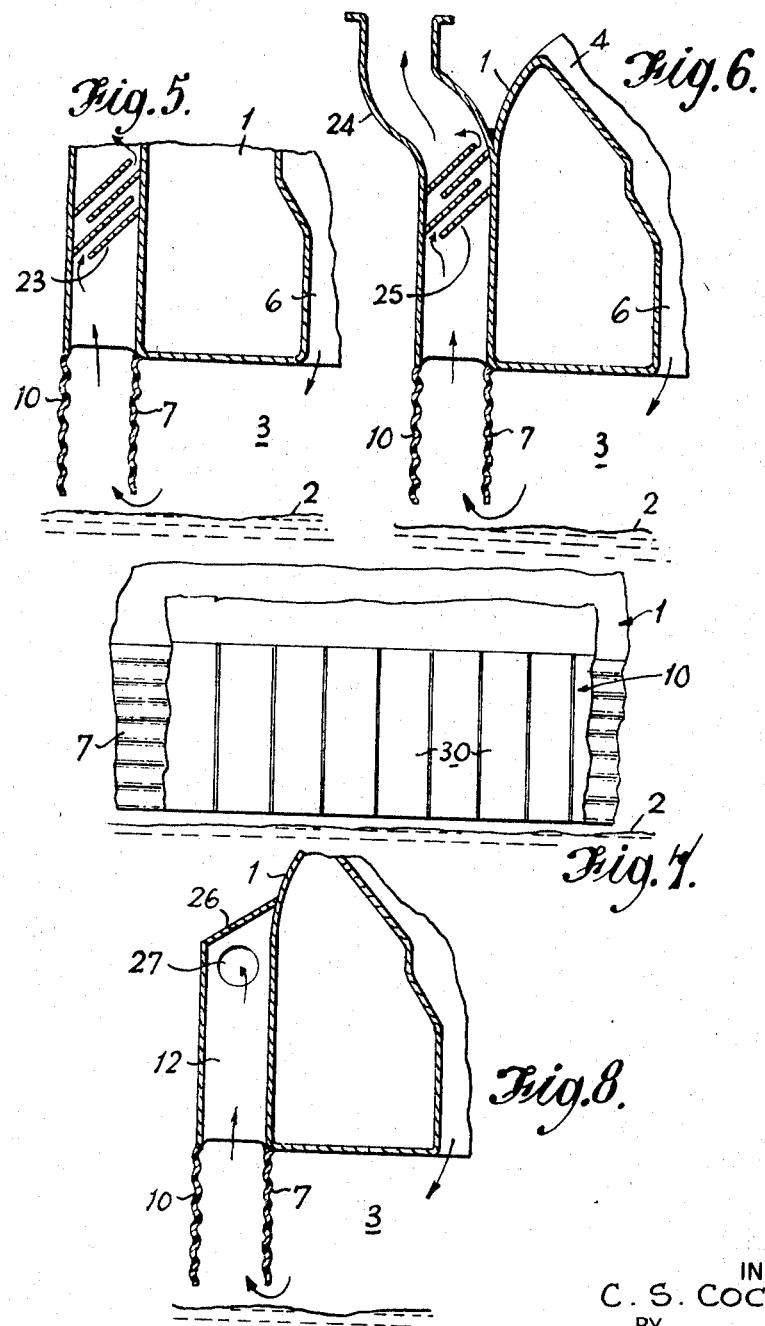

1

3,321,037
GAS-CUSHION VEHICLES
Christopher Sydney Cockerell, Southampton, England, assignor to Hovercraft Development Limited, London, England, a British company
Filed May 24, 1965, Ser. No. 458,305
Claims priority, application Great Britain, May 28, 1964, 22,203/64
6 Claims. (Cl. 180—7)

This invention relates to gas-cushion vehicles, that is to say, to vehicles for travelling over a surface and which are supported above that surface by at least one cushion of pressurized gas formed and contained in a space (the cushion space) beneath the vehicle.

In gas-cushion vehicles the cushion may be contained at its periphery by a wall structure, which may be of flexible construction, by a curtain of moving fluid issuing from the lower part of the vehicle and flowing towards the surface over which the vehicle is operating, or by a combination of wall structure and fluid curtain.

Where the cushion is contained solely by a wall structure, there is a peripheral outflow of cushion gas from beneath the wall structure. Where the cushion is contained solely by a fluid curtain, there is normally a flow of curtain forming fluid outwards away from the cushion plus also a flow of gas from the cushion. With a combination of fluid curtain and wall structure there is, again, an outward flow of both curtain-forming fluid and gas from the cushion.

The outward flow of gas from the cushion, and of fluid from the curtain, produces considerable spray when the vehicle is operating over water. It also produces clouds of dust and the like, and flows of other debris when the vehicle is operating over land surfaces. The present invention is particularly concerned with means for at least reducing the formation of spray and dust clouds and flows of other debris outside the vehicle.

According to the invention a gas-cushion vehicle is provided with wall means spaced outwardly from the periphery of the cushion space and extending for at least part of said periphery to form with adjacent parts of the vehicle body a vertically extending chamber having an upper part open to a region which, during operation of the vehicle, is at a pressure substantially lower than the pressure of said cushion, whereby a flow of fluid outwardly from said space is caused to flow upwardly through said chamber and foreign matter (for example spray or dust) present in said flow can separate therefrom in said chamber.

A connection can be made between the open region of the chamber and the inlet of the pump or compressor providing the cushion-forming gas and/or curtain forming fluid.

The invention will be readily understood by the following description of certain embodiments in conjunction with the accompanying drawings in which:

FIGURE 1 is a vertical cross-section through a vehicle, normal to the fore and aft axis thereof, FIGURES 2 and 3 are fragmentary cross-sections illustrating differing modifications of FIGURE 1, FIGURE 4 is a cross-section similar to that of FIGURE 1 illustrating a further embodiment, FIGURES 5 and 6 are further fragmentary cross-sections illustrating differing modifications of FIGURES 1 or 4, FIGURE 7 is a fragmentary side view illustrating yet a further modification of FIGURES 1 or 4, and FIGURE 8 is a fragmentary cross-section illustrating yet another modification of FIGURES 1 or 4.

FIGURE 1 illustrates a vehicle 1, of the so-called "plenum chamber" type, supported above a surface 2 by a cushion of pressurised gas formed in a cushion space 3.

2

The cushion is formed, in the present example, by atmospheric air drawn in through intakes 4 by propellers 5, the air being fed to the space 3 via ducts 6. The space 3 is bounded at its periphery by a flexible wall structure 7, of corrugated form, depending from the vehicle body. The wall structure 7 is of rubberised fabric. The vehicle is propelled over the surface 2 by airscrew propeller units 16.

As so far described the vehicle is of a known form. In operation the propellers 5 supply air to the space 3 and form therein the cushion of pressurised air which lifts and supports the vehicle above the surface 2. Once the vehicle is supported above the surface 2 excess air escapes to atmospheric from beneath the wall structure 7. This escaping air will, unless prevented, produce spray when the vehicle is operating over water and dust clouds and flows of other debris when the vehicle is over a land surface.

In the vehicle illustrated in FIGURE 1, a wall structure 10, of corrugated form, is positioned outside the wall structure 7 and extends substantially parallel to the structure 7 and also extends vertically outside the outer surface 11 of the vehicle body to form a chamber 12 between adjacent parts of the vehicle body, i.e. the wall structure 7 and surface 11. The top of the chamber 12 is open at 13 to the surrounding atmosphere. When the vehicle is supported by the cushion 3, excess cushion air escaping beneath the bottom of the wall structure 7 is barred from direct escape by the wall structure 10 and is caused to pass upwardly through the chamber 12, and foreign matter (for example, spray or dust) present in the flow can separate downwardly through the chamber 12 against said flow. The velocity of the escaping air is reduced as it flows through the chamber 12 so that the chamber acts as a settling chamber and little or no spray, dust or the like eventually issues from the top of the chamber at 13.

To allow the vehicle 1 to operate over irregular surfaces, the lower part of the wall structure 10 is preferably of flexible construction. As illustrated in FIGURE 1, it also preferably extends downwardly slightly below the level of the bottom of the wall structure 7. However, while the wall structure 7 has to contain the cushion pressure, the wall structure 10 has only to contain the pressure in the chamber 12. This is only slightly above atmospheric in the example shown and described above, and the flexible part of the member 10 can thus be of very light and easily deflectable construction, for example, rubberised fabric.

The loading of the vehicle and the pressure of the cushion in the space 3 have substantially no effect on the wall structure 10. Subject only to the ability of the propellers 5 to supply air at a high enough pressure, no flow occurs into the chamber 12 until the vehicle has been lifted sufficiently clear of the surface 2 to allow escape of atmosphere-seeking air from beneath the wall structure 7. Pressure of air within the chamber 12 has substantially no effect on the lifting capacity of the cushion in the space 3.

The wall structure 10 need not extend below the level of the bottom of the wall structure 7, as illustrated in FIGURE 1, but may extend to substantially the same level, as illustrated in FIGURE 2. As the pressure in the chamber 12 is substantially atmospheric only a very small flow of air will occur below the bottom of the structure 10. There is very little spray or dust created by this flow. Alternatively, the bottom of the wall structure 10 may be slightly above the level of the bottom of the wall structure 7.

FIGURE 3 illustrates the application of the invention to a vehicle in which the cushion space 3 is bounded by a curtain 20 of moving fluid (air). In this example the air curtain 20 is shown issuing from the bottom of a flexible skirt member 21 of the form disclosed by copending applications Ser. No. 267,695, filed Mar. 25, 1963, now abandoned, and Ser. No. 566,948, filed July 21, 1966, but other arrangements can be used. The curtain air is supplied by the ducts 6′, which connect with air supply manifolds 18 instead of terminating in the cushion space 3 as in FIGURE 1. The manifolds have open sides 19 from whence the air flows to form the curtains 20.

The curtain-forming air, instead of flowing outwards away from the vehicle, creating spray or clouds of dust, is induced to flow upwardly through the chamber 12 to be reduced in velocity, finally issuing from the top of the chamber 12, as in the previous examples. Containment of the cushion 3 by a curtain of fluid avoids any drag otherwise created by a wall structure 7, bearing in mind that the latter has to be strong enough to contain the cushion pressure. The drag created by the wall structure 10 is likely to be made less than that of a wall structure 7 as the former can be of lighter construction as explained above.

Propeller power requirements can be reduced by connecting the openings 13 of the chambers 12 to the intakes 4. FIGURE 4 illustrates an arrangement in which the wall structure 10 is continued up the sides of the vehicle by a duct conection 17 curved inward at its top so that the opening 13 at the top of the chamber 12 is brought adjacent to the intakes 4. The dimensions of the opening 13 can be such that the air leaving the connection 17 has some velocity head or other energy content. If only part of the cushion supply requirements are available from the chamber 12, additional air can be drawn in through the intakes 4 from the surrounding atmosphere, as indicated at 14. Air can also be drawn in through the intakes 14 from the atmosphere, as is required on start-up of the vehicle, and no flow of air occurs through the chamber 12.

With reference to FIGURE 5, the formation of spray and/or dust clouds may be further reduced by fitting flow baffles 23 within the chamber 12, so as to provide a tortuous path for the atmosphere-seeking fluid flowing through the chamber. As illustrated, the baffles 23 comprise a series of overlapping plates spaced slightly from each other at their side faces and alternately attached to the upper part of the wall structure 10 and the opposite-facing surface 11 of the vehicle body so as to define a zig-zag like path.

As illustrated in FIGURE 6, alternatively, or in addition to the baffles 23, the formation of spray and/or dust may be further reduced by adapting the chamber 12 so that it has one or more bends 24 at its outlet end.

With reference now to FIGURE 8, the opening 13 can be blanked-off by a cover 26 and the atmosphere-seeking air allowed to escape from the chamber 12 by way of one or more exit ports 27 perforating the upper rear portion(s) of the chamber, so as to impart, by reaction, a propulsive thrust to the vehicle 1.

The construction of the wall structure 10 can vary considerably. It can take any suitable form, and be either continuous or of multi-sectional form. Along the sides of the vehicle, for example, particularly when operating over water, it can be in the form of a thin wall which may be rigid or flexible. As the pressure to be contained is normally substantially atmospheric, the simplest and lightest forms of construction are suitable. For example, with reference to FIGURE 7, the wall structure can comprise a close-spaced series of individual downwardly extending flexible strips 30. Alternatively, hollow, inflatable wall structures can be used.

Wall structures 10 may be provided for the entire periphery of the vehicle or may extend for only parts of the periphery, for example along the sides of the vehicle.

The cushion space 3 may be sub-divided, in the known manner, by dividing members 25, as shown in FIGURES 1 and 4. Dividing members may extend both parallel to the fore and aft axis of the vehicle (as illustrated), normal to this axis, or at angles to the axis.

I claim:
1. A gas-cushion vehicle comprising a vehicle body adapted to be supported above a surface by a cushion of gas formed and contained in a space beneath the vehicle, a flexible wall structure having an upper portion fixed to, and a lower portion depending freely from, the vehicle body and bounding at least the upper part of the cushion periphery, wall means spaced outwardly from said flexible wall structure bounding the periphery of the cushion space and extending for at least part of said periphery to form with adjacent parts of the vehicle body a vertically extending chamber having an outlet at the upper part thereof open directly to the surrounding atmosphere, and means for supplying gas under pressure directly into the space beneath the vehicle body peripherally bounded by said flexible wall structure to form therein a cushion of pressurised gas, said wall means including a freely depending flexible portion extending downwardly substantially parallel to, and at least to substantially the same level as the bottom of, said flexible wall structure, whereby a flow of fluid outwardly from said cushion space beneath said flexible wall structure is caused to pass upwardly through said chamber and foreign matter present in said flow can separate therefrom in said chamber.

2. A vehicle as claimed in claim 1 wherein said lower part of said wall means comprises a close-spaced series of flexible strips depending from the vehicle body.

3. A vehicle as claimed in claim 1 including baffle means housed in said chamber for constraining fluid flow through the chamber to a tortuous path.

4. A vehicle as claimed in claim 1 wherein at least the upper part of said chamber includes a portion angularly inclined to the vertical so that fluid flowing through said chamber is constrained to a tortuous path.

5. A vehicle as claimed in claim 1 wherein the outlet of said chamber is positioned at the upper rear portion thereof, whereby the fluid flowing through said chamber is ejected rearwardly of the vehicle to assist propulsion of said vehicle.

6. A gas-cushion vehicle comprising a vehicle body adapted to be supported above a surface by a cushion of gas formed and contained in a space beneath the vehicle, a flexible wall structure having an upper portion fixed to, and a lower portion depending freely from, the vehicle body and bounding at least the upper part of the cushion periphery, a gas compressor housed in the vehicle body for supplying gas directly into the cushion space, wall means spaced outwardly from the periphery of the cushion space and extending for at least part of said periphery to form with adjacent parts of the vehicle body a vertically extending chamber region having an outlet at the upper part thereof open directly to the surrounding atmosphere, said wall means including a freely depending flexible portion extending downwardly substantially parallel to, and at least to substantially the same level, as the bottom of said flexible wall structure, whereby a flow of fluid outwardly from said cushion space beneath said flexible wall structure is caused to pass upwardly through said chamber and foreign matter present in said flow can separate therefrom in said chamber and duct means connecting the outlet of the chamber to the inlet of said compressor.

References Cited by the Examiner

UNITED STATES PATENTS

| 2,743,787 | 5/1956 | Seck. | |
| 2,842,084 | 7/1958 | Williams. | |
| 3,052,483 | 9/1962 | Petersen | 180—7 |
| 3,254,733 | 6/1966 | Deeley | 180—7 |

FOREIGN PATENTS

| 3,193,037 | 7/1965 | Great Britain. |
| 3,219,136 | 11/1965 | Great Britain. |

A. HARRY LEVY, *Primary Examiner.*